T 856,014

BEST AVAILABLE COPY

T856,014

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 335

707,972

TETRAHYDRO-QUINOLINE AND ANILINE BIS SULFONE METHINE DYES

John I. Dale II, and Max A. Weaver, both % Tennessee Eastman Company, P.O. Box 511, Kingsport, Tenn. 37662

Continuation-in-part of application Ser. No. 502,360, Oct. 22, 1965. This application Feb. 26, 1968. Published Nov. 12, 1968

Class 260—287

No Drawing. 19 Pages Specification

Compounds containing two aniline or tetrahydroquinoline groups each of which contain the group $$-CH=\overset{|}{C}-CN,$$

the two aniline or two tetrahydroquinoline groups being joined by the group $$-CH_2CH_2SO_2CH_2CH_2-Y-CH_2CH_2SO_2CH_2CH_2-$$

which is attached to the aniline or tetrahydroquinoline nitrogen atom, wherein Y is the residue of an active methylene compound. The disclosed compounds are useful as dyes for hydrophobic textile materials giving yellow to reddish yellow dying.